(12) United States Patent
Henry

(10) Patent No.: US 8,064,475 B2
(45) Date of Patent: Nov. 22, 2011

(54) SYSTEMS AND METHODS OF WIRELESS COMMUNICATION

(75) Inventor: Paul S. Henry, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1089 days.

(21) Appl. No.: 11/863,491

(22) Filed: Sep. 28, 2007

(65) Prior Publication Data

US 2008/0233946 A1 Sep. 25, 2008

Related U.S. Application Data

(60) Provisional application No. 60/896,243, filed on Mar. 21, 2007.

(51) Int. Cl.
*H04J 3/17* (2006.01)
(52) U.S. Cl. .......................... 370/433; 370/338
(58) Field of Classification Search .................. 370/433, 370/389, 392, 252, 349, 400, 401, 402, 471, 370/248, 395.2, 395.3, 395.54, 230, 235, 370/338, 342–345, 320–322, 347; 455/574
See application file for complete search history.

(56) References Cited

U.S. PATENT DOCUMENTS

| | | | |
|---|---|---|---|
| 6,490,443 B1 * | 12/2002 | Freeny, Jr. ..................... | 455/406 |
| 6,813,485 B2 | 11/2004 | Sorrells | |
| 6,965,816 B2 | 11/2005 | Walker | |
| 6,968,364 B1 | 11/2005 | Wong | |
| 7,070,110 B2 | 7/2006 | Lapstun | |
| 7,082,106 B2 | 7/2006 | Sharma | |
| 7,082,141 B2 | 7/2006 | Sharma | |
| 7,089,099 B2 | 8/2006 | Shostak | |
| 7,092,406 B2 | 8/2006 | Sharma | |
| 7,097,106 B2 | 8/2006 | Silverbrook | |
| 7,103,460 B1 | 9/2006 | Breed | |
| 7,150,398 B2 | 12/2006 | Silverbrook | |
| 7,159,777 B2 | 1/2007 | Silverbrook | |
| 7,188,769 B2 | 3/2007 | Silverbrook | |
| 7,243,849 B2 | 7/2007 | Lapstun | |
| 7,706,369 B2 * | 4/2010 | Roese et al. .................. | 370/389 |

(Continued)

OTHER PUBLICATIONS

White Spaces Coalition, www.wikipedia.org, Aug. 17, 2007 (2 pgs).

(Continued)

*Primary Examiner* — Chuong T Ho
(74) *Attorney, Agent, or Firm* — Toler Law Group

(57) ABSTRACT

Systems and methods for wireless communication are provided. In a particular embodiment, a base station device is disclosed that includes an interface coupled to a network to communicate with a central controller and a wireless transceiver adapted to communicate wirelessly with one or more portable devices via a local area network. The base station device also includes logic coupled to the interface and to the wireless transceiver. The logic communicates with the remote central controller device via the network to receive an authorization to communicate wirelessly. The logic selectively activates the wireless transceiver after receiving the authorization.

21 Claims, 11 Drawing Sheets

U.S. PATENT DOCUMENTS

| | | |
|---|---|---|
| 2003/0093187 A1 | 5/2003 | Walker |
| 2003/0110503 A1 | 6/2003 | Perkes |
| 2004/0045030 A1 | 3/2004 | Reynolds |
| 2004/0267551 A1* | 12/2004 | Yadav .............................. 705/1 |
| 2005/0187677 A1 | 8/2005 | Walker |
| 2005/0192727 A1 | 9/2005 | Shostak |
| 2005/0273218 A1 | 12/2005 | Breed |
| 2006/0025897 A1 | 2/2006 | Shostak |
| 2006/0067354 A1* | 3/2006 | Waltho et al. ................. 370/433 |
| 2006/0193295 A1 | 8/2006 | White |
| 2006/0206246 A1 | 9/2006 | Walker |
| 2006/0238877 A1 | 10/2006 | Ashkenazi |
| 2006/0287008 A1* | 12/2006 | Twitchell, Jr. ................ 455/574 |
| 2007/0088553 A1 | 4/2007 | Johnson |
| 2007/0124144 A1 | 5/2007 | Johnson |
| 2007/0139200 A1 | 6/2007 | Yushkov |
| 2008/0220795 A1* | 9/2008 | Bose et al. ................. 455/456.5 |
| 2010/0048234 A1* | 2/2010 | Singh ........................... 455/509 |

OTHER PUBLICATIONS

Chris Rogers, Cognitive UHF Radio Update, Oct. 23, 2006, NBI/Intel Corporation (11 pgs).

Eric Bangeman, The White Spaces Coalition's plans for fast wireless broadband—The technology, Ars Technica, www.arstechnica.com, Apr. 17, 2007, (2 pgs).

Eric Bangeman, The White Spaces Coalition's plans for fast wireless broadband—Fast broadband without fiber . . . or even wires, Ars Technica, www.arstechnica.com, Apr. 17, 2007, (2 pgs).

* cited by examiner

SYSTEMS AND METHODS OF WIRELESS COMMUNICATION

CROSS-REFERENCE TO RELATED APPLICATION(S)

This application is a non-provisional patent application of and claims priority from U.S. Provisional Patent Application No. 60/896,243, entitled "SYSTEM AND METHOD FOR WIRELESS COMMUNICATION," filed on Mar. 21, 2007, which is incorporated herein by reference in its entirety.

FIELD OF THE DISCLOSURE

The present disclosure is generally related to systems and methods of wireless communication.

BACKGROUND

In general, in the United States, the Federal Communications Commission (FCC) regulates wireless transmission frequency bands. For years, broadcasters have been licensed by the FCC for analog television channel transmission via licensed frequency bands within a frequency range from approximately 54 MHz to approximately 700 MHz. Generally, within a range of approximately 100 kilometers from a broadcast tower, unlicensed television transmissions are prohibited.

Recognizing that the UHF TV band (roughly 500 to 700 MHz) may be useful for consumer-oriented applications, the FCC is seeking to allow unlicensed users (such as individual consumers) to use these frequencies in 'whitespace' areas, that is, areas where individual TV channels are unused by licensed operators such as TV broadcasters or areas that do not receive UHF TV band signals.

However, there are potential problems presented by unlicensed UH whitespace applications. For example, the long propagation range of UHF frequencies opens the possibility that an unlicensed user, operating outside the nominal coverage area of a TV station, could nonetheless cause interference to a TV watcher within the station's coverage area many miles away by transmitting data in the same frequency band as a channel being viewed by the TV watcher. This may be a particular problem for mobile devices (i.e. portable devices, such as laptop-type portable local area network (LAN) devices) since users may take their mobile devices into locations within or near a station's coverage area.

DETAILED DESCRIPTION OF THE DRAWINGS

Figure 1:
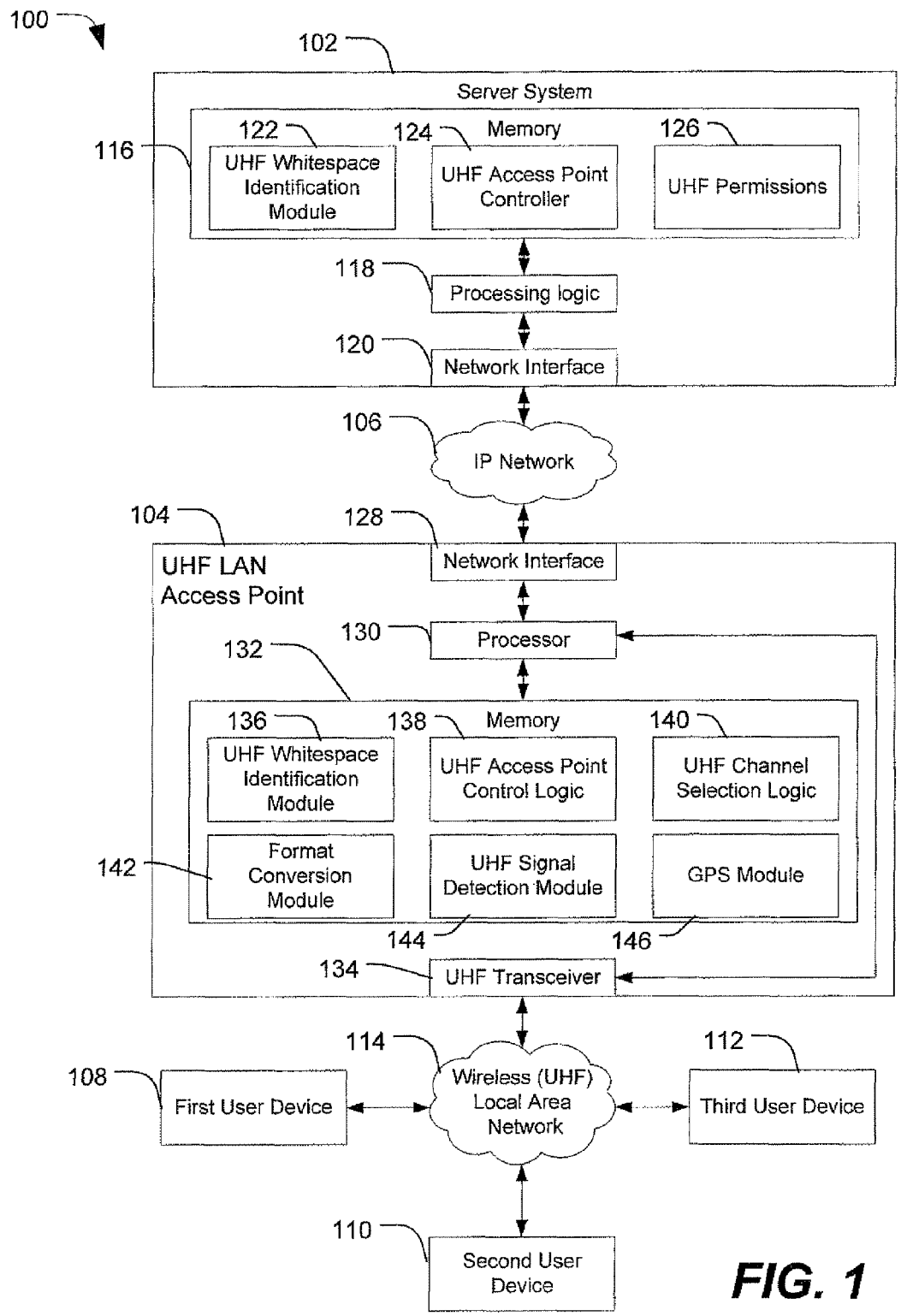
FIG. 1 is a block diagram of a first particular illustrative embodiment of a system to communicate wirelessly.

Embodiments disclosed herein include a system where mobile client devices can be moved about within a defined region to provide multimedia wireless services via UHF whitespace without causing interference with TV signal transmissions. In a particular illustrative embodiment, the UHF whitespace refers to geographic areas that are not covered by a licensed UHF broadcaster (i.e., geographic areas where a UHF signal strength falls below a usable television broadcast signal strength). In another particular illustrative embodiment, the UHF whitespace may also refer to unused channels within a UHF spectrum. In this instance, within a geographic area that receives UHF television broadcast signals, unused channels may exist where broadcasters do not broadcast within particular frequency bands (channels).

In a particular embodiment, a base station device is disclosed that includes an interface coupled to a network to communicate with a central controller and a wireless transceiver adapted to communicate wirelessly with one or more portable devices via a local area network. The base station device also includes logic coupled to the interface and to the wireless transceiver. The logic communicates with the remote central controller device via the network to receive an authorization to communicate wirelessly. The logic selectively activates the wireless transceiver after receiving the authorization.

In another particular embodiment, a controller system is disclosed that includes an interface to receive an authorization request from a base station device via a network. The authorization request includes data related to a location associated with the base station device. The controller system also includes logic coupled to the interface and adapted to selectively authorize wireless UHF communications by the base station device based on the data. The logic communicates an authorization to the base station device via the network.

In still another particular embodiment, a method of wireless communication is disclosed that includes sending an authorization request to a server system via a wide area network requesting authorization to communicate wirelessly with one or more devices via an Ultra-High Frequency (UHF) band associated with a local area network. The method also includes communicating with the one or more devices via the UHF band, after receiving an authorization signal from the server system.

In another particular embodiment, a system to communicate wirelessly is disclosed that includes processing logic and a memory accessible to the processing logic. The memory includes instructions executable by the processing logic to receive a registration signal from a base station device, determine whether the base station device is at an authorized location, and send an authorization signal to the base station device when the base station device is at an authorized location. The authorization signal authorizes the base station device to communicate wirelessly with one or more devices using a frequency in an ultra-high frequency (UHF) band.

FIG. 1 is a block diagram of a particular illustrative embodiment of a system 100 to communicate wirelessly. The system 100 includes a server system 102 that communicates with an ultra-high frequency (UHF) local area network (LAN) access point (sometimes referred to as a base station device) 104 via a first network, such as an Internet Protocol (IP) network 106. In an alternative embodiment, the server system 102 may communicate with an UHF LAN access point 104 via wireless network, a public switched telephone network, another network, or any combination thereof. In a particular example, the IP network 106 may be a broadband communications network, such as a high speed Internet communications network. The server system 102 is adapted to selectively authorize the UHF LAN access point 104 to communicate wirelessly with one or more devices, such as a first user device 108, a second user device 110 and a third user device 112, via a wireless UHF local area network (LAN) 114 using UHF wireless signals. Such UHF wireless signals may be selected from a plurality of frequency bands or channels within a UHF spectrum that ranges from approximately 54 MHz to approximately 700 MHz.

The server system 102 includes one or more computing devices. The server system 102 includes a network interface 120 that communicates with the network 106. The server system 102 also includes processing logic 118 and a memory 116 accessible to the processing logic 118. The processing logic 118 and the memory 116 may be distributed across one or more computing devices, depending on the implementation. The memory 116 includes a UHF whitespace identification module 122 that is executable by the processing logic 118 to determine a location of a UHF requesting device relative to restricted UHF broadcast areas. The memory 116 also includes a UHF access point controller 124 that is executable by the processing logic 118 to access UHF broadcast permissions 126 and to selectively authorize the UHF LAN access point 104 to communicate wirelessly with the one or more user devices 108, 110, and 112 via the wireless UHF LAN 114. In a particular example, the server system 102 can be provided by an Internet Service Provider (ISP), a governmental agency, a telecommunications company, a cable company, a wireless communication service provider, another organization, or any combination thereof. In a particular example, the server system 102 may be located at a central office associated with a service provider, such as a wireless service provider, a telephone company, a cable company, an ISP, or any combination thereof. In another embodiment, the server system 102 may be located at a head end of a content delivery network, such as a television broadcast network, a cable network, a video on demand, or any combination thereof. In another particular example, the server system 102 may be located in an area that is remote from a service provider network, such as near a television broadcast tower, in a location within a UHF whitespace area (i.e., an area where there is no licensed UHF television broadcast signals).

The UHF LAN access point 104 includes a network interface 128 that communicates with the network 106. The UHF LAN access point 104 also includes a processor 130, a memory 132 accessible to the processor 130, and a UHF transceiver 134 that is adapted to send and receive data to and from other devices, such as the first, second and third user devices 108, 110, and 112 via the wireless UHF LAN 114. The memory 132 includes a UHF whitespace identification module 136 and a UHF signal detection module 144 that are executable by the processor 130 to detect UHF signals in a geographic area of the UHF LAN access point 104 and to determine a relative proximity of the UHF LAN access point 104 to a restricted whitespace area, at least in part based on a strength of detected UHF signals. It should be understood that the memory 116 may be distributed. The memory 132 and the memory 116 may include control logic, such as a processor, storage media, control software, and various other features and functions that are omitted from this discussion for the purpose of clarity.

In a particular illustrative embodiment the UHF LAN access point 104 includes a global positioning system (GPS) module 146 to determine a location of the UHF LAN access point 104. A relative proximity of the UHF LAN access point 104 to the restricted whitespace area may be determined based on the determined UPS location. The memory 132 also includes UHF access point control logic 138, which may be executable by the processor 130 to communicate data related to an authorization request to the server system 102 via the network 106 for authorization to communicate using UHF signals. The authorization request may include location data related to the UHF LAN access point 104. The UHF access point control logic 138 can receive an authorization from the server system 102 and can activate the transceiver 134 to communicate via UHF signals after receiving the authorization.

In a particular illustrative embodiment, the memory 132 may also include UH channel selection logic 140 that is executable by the processor 130 in conjunction with the UHF signal detection module 144 to identify unused channels within a UHF spectrum. The UHF access point control logic 138 may be executable by the processor 130 to communicate data related to an access request to the server system 102 to request authorization to communicate via one or more of the unused UHF channels. In response to receiving an authorization from the server system 102, the UHF access point control logic 138 may activate the UHF transceiver 134 to communicate wirelessly with one or more devices via an authorized one of the unused UHF channels. In a particular illustrative embodiment, the server system 102 may authorize the UHF LAN access point 104 to communicate wirelessly with the first user device 108 via a first unused UHF channel and to communicate wirelessly with the second user device 110 via a second unused UH channel.

The memory 132 can also include a format conversion module 142 that is executable by the processor 130 to convert data from one frequency to another, from one data format to another, and so on. In a particular example, the format conversion module 142 may be utilized by the UHF LAN access point 104 to convert between data transmission protocols, such as from a time division multiplexed (TDM) protocol to a frequency division multiplexed (FDM) protocol or from an Internet Protocol to another communication protocol.

In a particular example, the server system 102 is adapted to receive data related to an authorization request from the UHF LAN access point 104. The data may include information about a detected UHF signal strength at the UHF LAN access point 104, location data related to the UHF access point, global positioning system (GPS)-determined location information, network router information associated with the UHF LAN access point 104, unused UHF channel information, other information, or any combination thereof. The server system 102 may utilize the UHF whitespace identification module 122 to determine whether the UHF LAN access point 104 is operating in a UHF whitespace area based on the data sent with the authorization request. The server system 102 may alternatively determine one or more unused UHF channels proximate to the location associated with the UHF LAN access point 104. Based on the determination, the server system 102 may utilize the UHF access point controller 124 and the UHF permissions 126 to selectively authorize the UHF LAN access point 104 to communicate wirelessly with other devices via frequencies with one or more UHF bands. In a particular example, the server system 102 may authorize the UHF LAN access point 104 to communicate using an available (unused) UHF band (channel), that might otherwise correspond to a broadcast television channel, based in part on the location of the UHF LAN access point 102, a detected UH signal strength at the UHF LAN access point 102, other information, or any combination thereof.

In another particular example, the UHF LAN access point 104 may power up and activate the UHF transceiver 134 to scan a UHF spectrum for UHF signals above a particular signal strength threshold. The UHF LAN access point 104 may utilize the whitespace identification module 136, the UHF signal detection module 144, the channel selection logic 140, the GPS module 146, and the UHF access point control logic 138, to determine whether detected UHF signals fall below a threshold level. In a particular example, the threshold level may be approximately 30 dB below a minimum signal strength for a television tuner to receive a broadcast television signal. Alternatively, the UHF LAN access point 104 may utilize the UHF signal detection module 144 to identify one or more unused UHF channels within a UHF spectrum. The UHF LAN access point 104 can communicate data related to an authorization request to the server system 102 to request authorization to communicate wirelessly using UHF signals. The UHF LAN access point 104 may power off the UHF transceiver 134 until the server system 102 authorizes the UHF LAN access point 104 to communicate using wireless UHF signals. After receiving authorization, the UHF LAN access point 104 can activate (e.g., power on) the UHF transceiver 134 to communicate with one or more devices using UHF signals.

Figure 2:
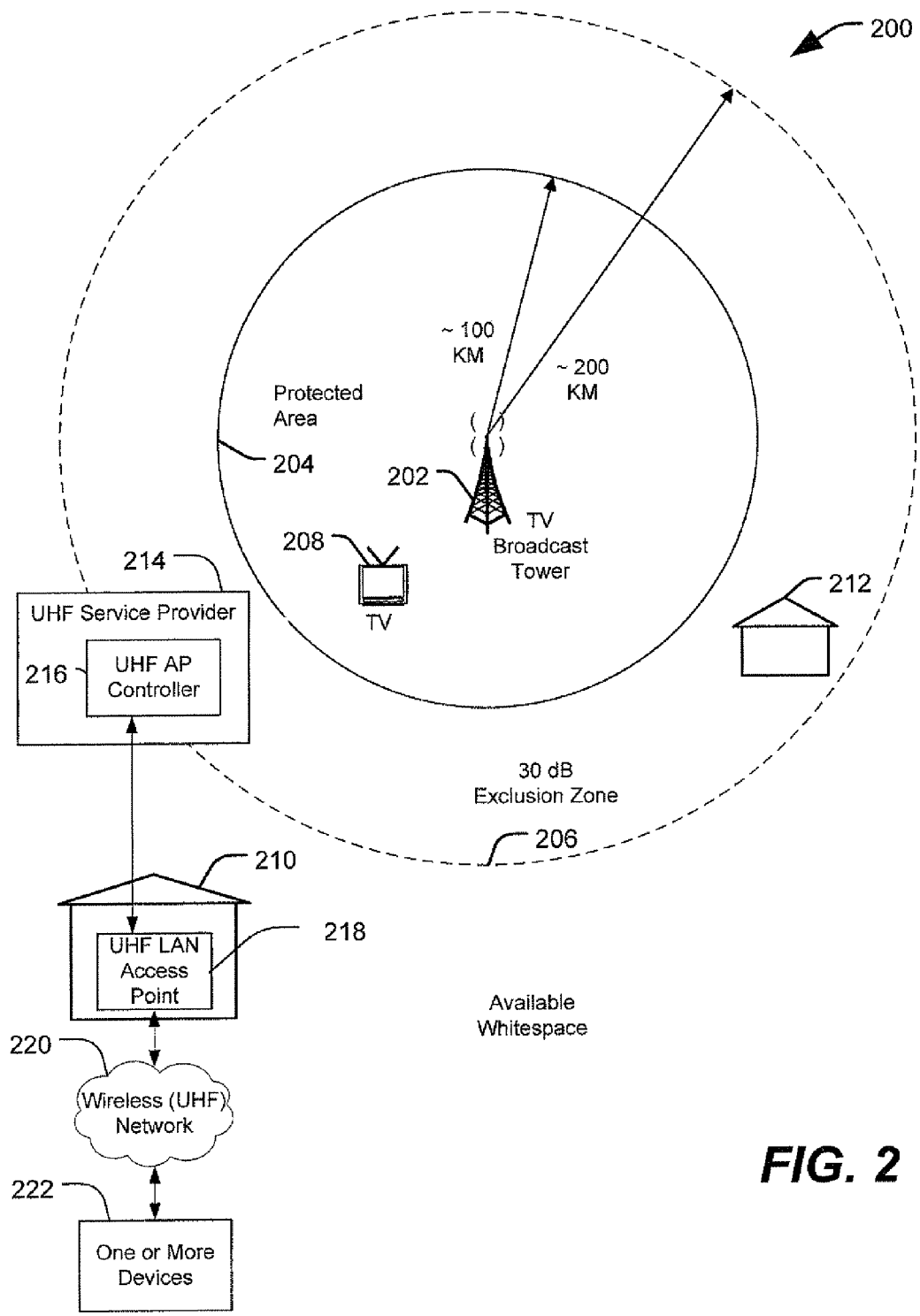
FIG. 2 is a diagram of a second particular illustrative embodiment of a system to communicate wirelessly.

FIG. 2 is a diagram of a second embodiment of a system for wireless communication, generally designated 200. FIG. 2 depicts representative TV parameters. The system 200 includes a TV broadcast device 202, such as a TV broadcast tower associated with a television station. The TV broadcast device 202 transmits television signals within a protected area 204. In general, the protected area 204 represents a licensed broadcast area within which the television signal is strong enough to ensure good picture quality by a user's TV set 208.

As a representative example, the protected area 204 may include an area within a range of about 100 kilometers (km) from the TV broadcast device 202. An exclusion zone 206 includes an area outside of the protected area 204 where the television broadcast signal may still be received but at reduced signal strength (i.e., the signal is attenuated). The Federal Communication Commission (FCC) has asked for comment on criteria for using unlicensed 1H local area network (LAN) devices, where the TV signal strength is attenuated to a level that is at least 30 dB below a nominal level (i.e., 30 dB below the level at which a conventional television tuner can produce a visible image).

In the representative example of FIG. 2, the exclusion zone 206 is estimated to include areas up to about 200 km from the TV broadcast device 202. A user having a residence outside the exclusion zone 206, such as residence 210, may be able to use an in-home UHF LAN with a spectrum sensing arrangement. However, a user having a residence within the exclusion zone 206, such as residence 212, may not be able to utilize a spectrum sensing UHF LAN because the signal from the TV broadcast device 202 may still be too strong for the spectrum sensing criterion to determine that the channel is unoccupied, even though the residence 212 may not be able to receive the TV channel associated with the TV broadcast device 202.

The residence 210 includes a UHF LAN access point 218, which is adapted to communicate with a UHF access point controller 216 at a UHF service provider 214 to request and receive authorization to communicate with one or more devices 222 via a wireless UHF network 220. In a particular illustrative example, the UHF LAN access point 218 may be adapted to detect the absence of UHF signals (i.e., to determine that the UHF LAN access point 218 is operating in a UHF whitespace) and to communicate data related to the absence of UHF signals, data related to a location of the UHF LAN access point 218 (logical addresses such as network addresses or physical locations, such as UPS locations), other data or any combination thereof. The UHF Access point controller 216 can receive a UHF authorization request and can selectively authorize the UHF LAN access point 218 to communicate using signals based on the data included in the request.

In a particular example, the UHF LAN access point 218 communicates wirelessly with the one or more devices 222 using UHF signals after receiving an authorization from the UHF access point controller 216. Otherwise, the UHF LAN access point 218 does not communicate wirelessly using UHF signals. In a particular example, the UHF LAN access point 218 may request authorization on startup, and if the authorization request is denied or if no response is received, the UHF LAN access point 218 may turn itself off. In a particular embodiment, the UHF LAN access point 218 may be referred to as a base station device.

Figure 3:
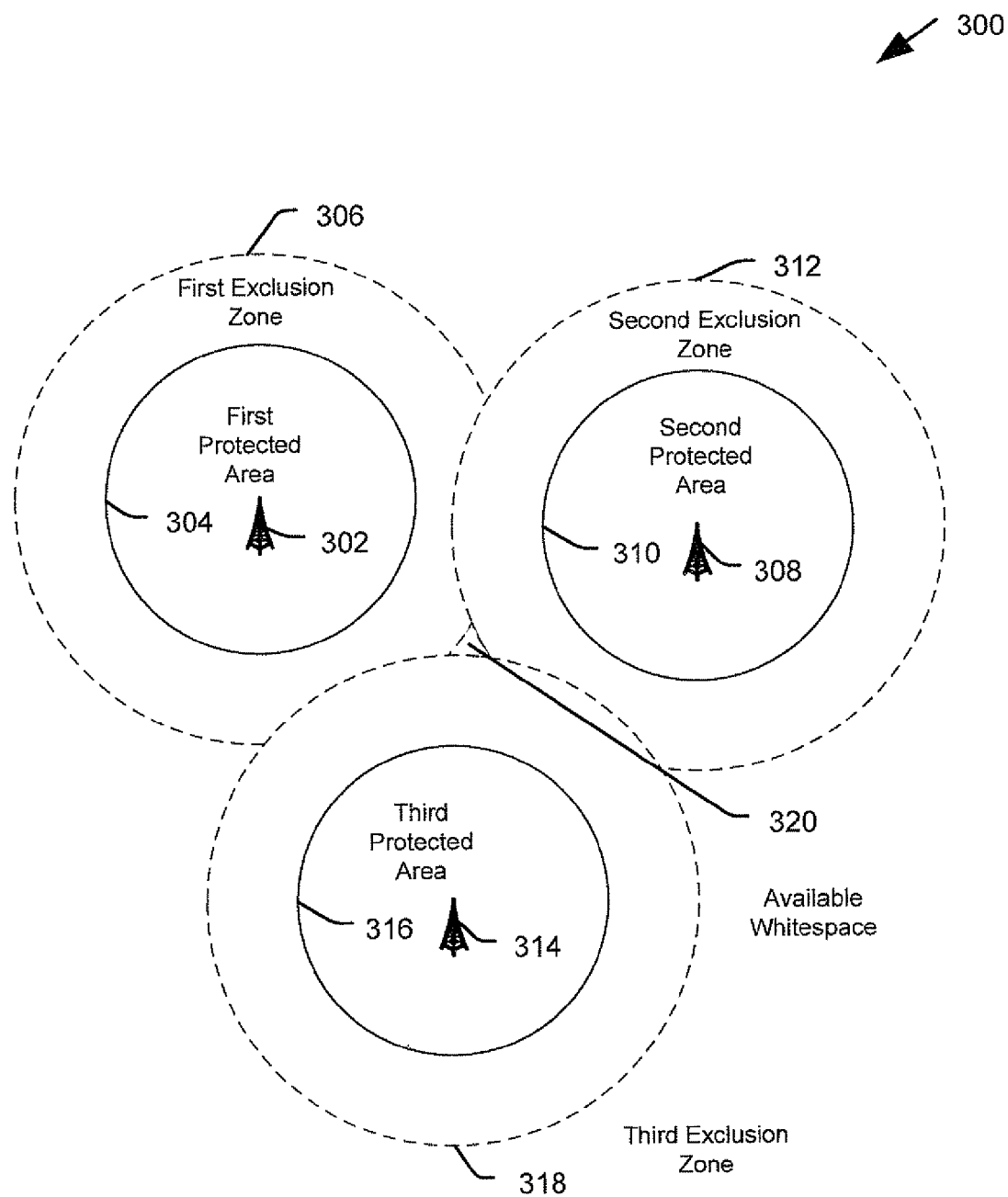
FIG. 3 is diagram of a third particular illustrative embodiment of a system to communicate wirelessly.

FIG. 3 is a diagram of a third embodiment of a system for wireless communication, generally designated 300. The system 300 includes a first TV broadcast device 302 having a first protected area 304 and a first exclusion zone 306, a second TV broadcast device 308 having a second protected area 310 and a second exclusion zone 312, and a third TV broadcast device 314 having a third protected area 316 and a third exclusion zone 318. The system 300 illustrates that in certain configurations, the exclusions zones 306, 312, 318 associated with television stations in certain areas may virtually eliminate all available whitespace. For example, even though the protected areas 304, 310, 316 do not overlap, the exclusion zones 306, 312, 318 overlap significantly, leaving only a very small area of whitespace 320 where consumers may be able to use unlicensed UHF devices.

In a particular embodiment, a method of using the open (that is, unutilized or unused) Ultra-High Frequency (UHF) television (TV) broadcast frequencies is disclosed. Such open frequencies may also be referred to as 'Whitespace' spectrum. In a particular embodiment, these open frequencies may be utilized to provide wireless multimedia networking, e.g., for in-home applications. In particular embodiments, local area network devices, such as the UHF LAN access point 104 illustrated in FIG. 1, can utilize otherwise unused UHF frequencies to significantly reduce costs associated with providing broadband services within homes. For example, costs associated with wiring broadband services including home wiring and set up for cable television, Internet Protocol Television (IPTV), other broadband services, or any combination thereof, may be reduced, thereby reducing the number of service provider truck rolls required to install and support customers.

Wireless local area networks (LANs) using UHF transmissions may have significant advantages over existing wireless local area network (LAN) technologies, such as Wireless Fidelity (WiFi) systems, which typically operate at frequencies well above the UHF TV band. For example, UHF LANs may have increased range and increased data rates relative to other types of LANs. For example, data rates available in a UHF LAN may be sufficient to support high-definition television (HDTV) transmissions and other multimedia capability.

Figure 4:
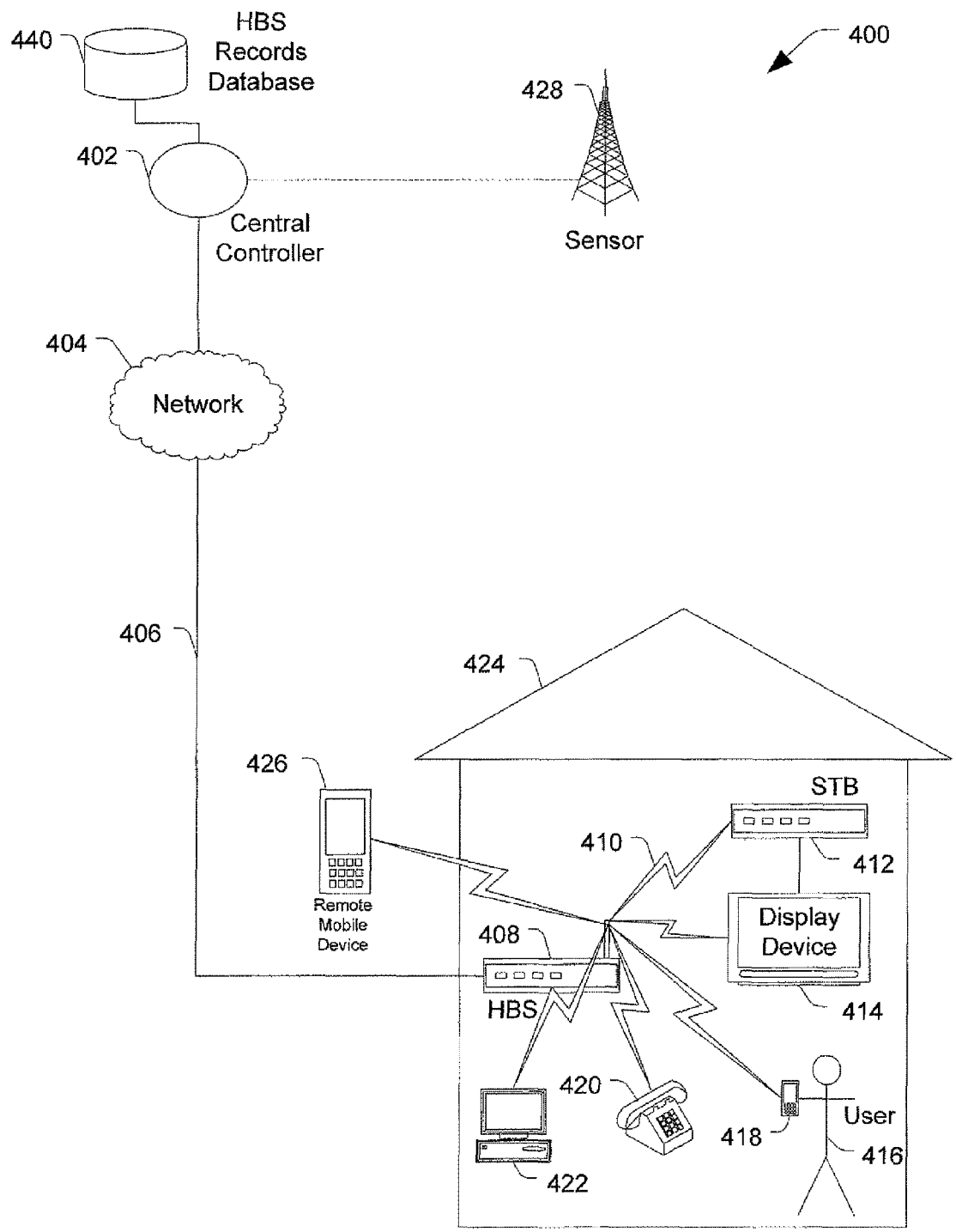
FIG. 4 is diagram of a fourth particular illustrative embodiment of a system to communicate wirelessly.

FIG. 4 is a diagram of a fourth embodiment of a system for wireless communication, generally designated 400. The system 400 includes a remotely located central controller 402 in communication with a home base station device (BS) 408 (i.e., a UHF LAN access point) via a network 404. In a particular embodiment, the network 404 may include a public network, such as the Internet, or a private network, such as an access network of an Internet Protocol Television (IPTV) system. The central controller 402 and HBS 408 may be coupled via a wireless communication signal, a digital subscriber line (DSL), a cable line, a fiber optic connection, or any other communication medium.

In a particular embodiment, the central controller 402 may send a control signal to the HBS 408 authorizing the BBS 408 to operate, e.g., to transmit wireless UHF communication signals, such as the wireless signal 410, to one or more portable devices, such as a set-top box device 412, a display device 414, a portable device 418, a telephone 420, a computing device 422, one or more other devices, such as the remote mobile device 426, or any combination thereof. The HBS 408 may be associated with a customer residence 424. The HBS 408 may be adapted to communicate using UHF channels only when the control signal from the central controller 402 is received. In a particular embodiment, the central controller 402 may include or be coupled to an HBS records database 440. The HBS records database 440 may include information associated with the FIBS 408. Additionally, the FIBS records database 440 may include information related to UHF protected areas, such as the protected area 204 illustrated in FIG. 2. In a particular illustrative example, the central controller 402 may be implemented on a server at an Internet Service Provider (ISP), a telecommunications company, a governmental agency, another organization, or any combination thereof. Additionally, the HBS records database 440 may be maintained by a governmental agency, another organization, the ISP, or any combination thereof. In a particular example, the HBS records database 440 may be maintained by an agency affiliated with the Federal Communications Commission (FCC), and the central controller 402 may be hosted at a server of the ISP, where the central controller 402 is adapted to communicate with the FCC hosted HBS records database 440 via a secure connection.

In a particular example, the FIBS records database 440 may include an authorized location record indicating a location at which the HBS 408 is authorized to operate. The authorized location record may be determined based on the location of the customer residence 424 relative to a TV broadcast device. Thus, if the HBS 408 is moved to a different location, the HBS 408 may not function, or may not function using UHF frequencies. In a particular illustrative embodiment, the HBS 408 may communicate with one or more edge routers and other network devices associated with the network 404. If the HBS 408 communicates with the remote central controller 402 via an unexpected network path (i.e., unexpected routers, etc.), the remote central controller 402 can determine that the HBS 408 has been moved from its authorized location and the central controller 402 may refuse to authorize the HBS 408.

In a particular embodiment, the system 400 may also include a sensor 428. The sensor 428 may monitor a particular area to determine whether transmissions from the HBS 408 may interfere with licensed TV transmissions. For example, the sensor 428 may detect signals sent from the HBS 408 to one or more mobile devices. If UHF transmissions from the HBS 408 are detected, the sensor 428 may send a signal to the remote central controller 402 indicating that the transmissions were detected and specifying which HBS sent the detected signals.

In a particular embodiment, the HBS 408 sends an authorization signal to the one or more mobile devices 412, 414, 418, 420, 422, 426 authorizing them to communicate using UHF frequencies when the HBS 408 is authorized by the central controller 402 to do so. Thus, if the central controller 402 does not authorize the HBS 408 to transmit using UHF frequencies, then the HBS 408 also does not authorize the mobile devices 412, 414, 418, 420, 422, 426 to transmit using UHF frequencies, and no interference with TV broadcasts results.

In a particular embodiment, the BS 408 may determine a location of multiple devices 412, 414, 418, 420, 422 and 426. For example, each device may send a location signal to the HBS 408. The location signal may be a signal indicating the actual location of the device; a location of the device relative to some known location, such as the location of the HBS 408; or a signal by which the HBS 408 can approximate or estimate the location of the device, e.g., based on degradation of the signal. If a mobile device, such as mobile device 426, is outside an authorized area of operation of the HBS 408, the HBS 408 may not authorize the mobile device 426 to transmit using UHF frequencies.

In a particular embodiment, low-power multimedia wireless local area network (MWLAN) devices, such as the HBS 408 and the mobile devices 412, 414, 418, 420, 422 and 426, may cause interference with a television signal only within a radius of about 3-4 km. If such devices are kept at least this distance outside the protected area of a TV station, then the system 400 can be used to selectively permit UHF communications between an HBS 408 having UHF communication features and one or more remote devices without interfering with UHF television broadcasts.

Figure 5:
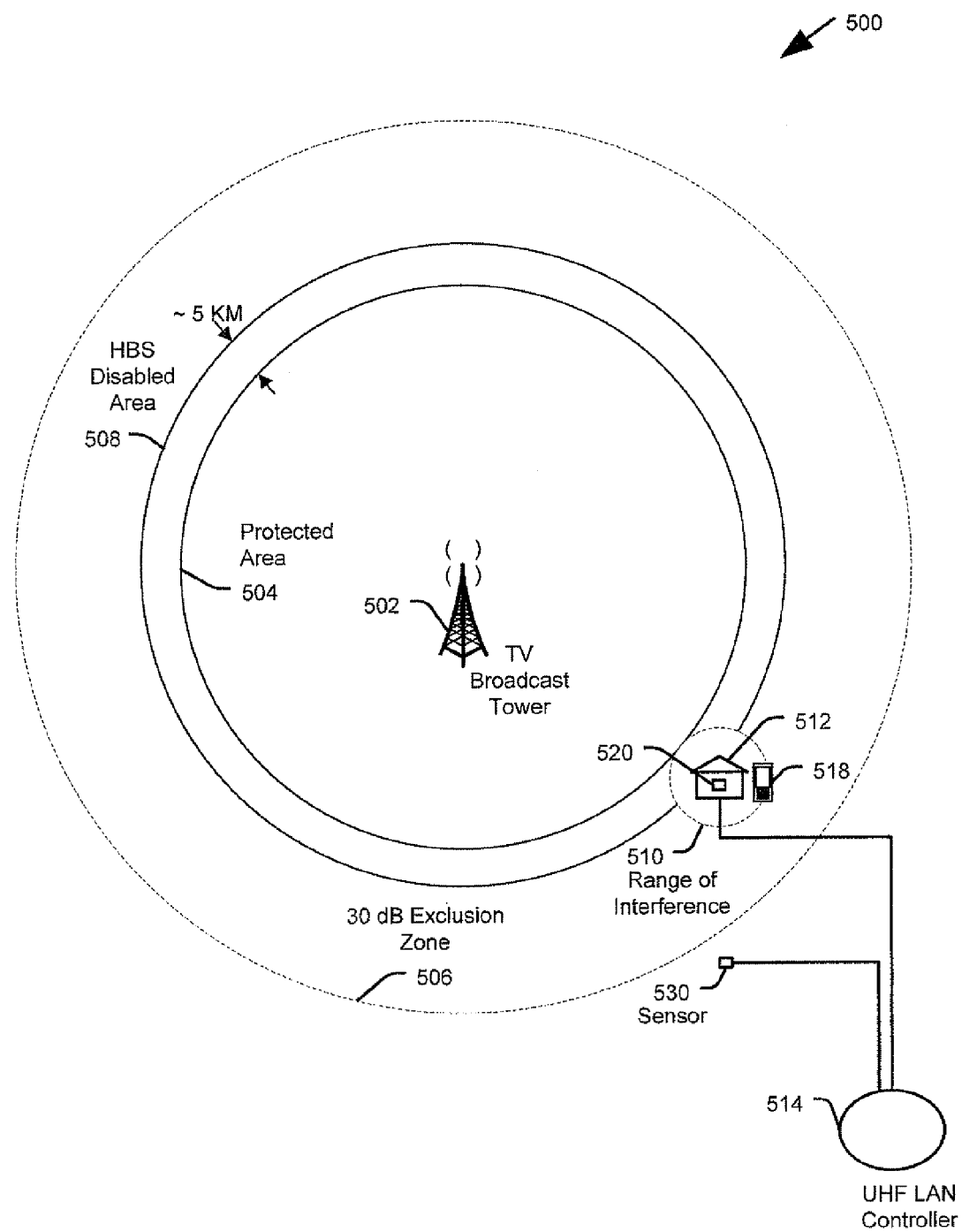
FIG. 5 is diagram of a fifth particular illustrative embodiment of a system to communicate wirelessly.

FIG. 5 is a diagram of a fifth embodiment of a system for wireless communication, generally designated 500. The system 500 illustrates a three-level control architecture to keep MWLAN devices a sufficient distance from a protected area 504 associated with a TV broadcast device 502. The system 500 includes a residential MWLAN client 518, such as one of the mobile devices 412, 418, 420, 422, and 426 depicted in FIG. 4, at a residence 512. The MWLAN client 518 is allowed to transmit only by permission from a Home Base Station (FIBS) 520 at the residence 512. The HBS 520 is only allowed to transmit when authorized by a central controller, such as a UHF LAN controller 514. The UHF LAN controller 514 may communicate with the HBS 520 via a wired link, such as a digital subscriber line (DSL) connection, a cable connection, a fiber connection, another broadband connection, a dial-up connection, or any combination thereof. The HBS 520 ensures that the MWLAN client 518 stays within a predetermined range by, for example, power-level sensing and/or radio ranging, e.g., pinging (using either TV frequencies or some other band, such as a 940 MHz Industry, Scientific and Medical (ISM) band), other location sensing methods, or any combination thereof. Alternatively, the MWLAN client 518 may include a global positioning system (GPS) that can provide GPS location data to the HBS 520, which may utilize the location data to determine whether the MWLAN client 518 is within the predetermined range.

Upon initial power-up in the home, the FIBS 520 registers with the UHF LAN controller 514. The HBS 520 operates within its assigned residential location 512. The HBS 520 may be adapted to function only when a continuous connection to the UHF LAN controller 514 is detected. Additionally, the HBS 520 may authorize MWLAN clients, such as the WMLAN client 518, to operate when it receives permission to activate its clients from the UHF LAN controller 514. If the HBS 520 is moved to a location outside the home 512 (e.g. to achieve wide-area portability), the change in location can be detected by the UHF LAN controller 514 and permission to operate may be withdrawn or denied. In this instance, the FIBS 520 may notify the WMLAN client 518 that authorization to broadcast has been withdrawn, thereby shutting down UHF broadcasting. Such a shutdown notification may be a short UHF burst that would present a negligible interference to a television broadcast. In a particular example, a client device 518 may be implemented to require continuous authorization from the BS 520, such that cessation of the authorization would result in the client device 518 shutting down.

In a particular embodiment, the link from the UHF LAN controller 514 to the HBS 520 may be wireless or wired. Additionally, the UHF LAN controller 514 may utilize the sensor 530 to detect UHF broadcasts, either from the TV broadcast tower 502 or from the FIBS 520. If UHF signals from the TV broadcast tower 502 are detected at the sensor 530, the UHF LAN controller 514 may withdraw authorization for the HBS 520 to transmit using UHF signals.

In a particular example, the HBS 520 may be adapted to communicate using 802.11-type wireless signals in a first mode and to communicate using UHF wireless signals in a second mode. The HBS 520 may operate using only 802.11-type wireless signals, unless the HBS 520 receives an authorization from the UHF LAN controller 514 to communicate using UHF signals.

In a particular embodiment, the UHF LAN controller 514 may grant permission to the HBS 520 to communicate wirelessly using UHF signals based on the location of the HBS 520 relative to the TV broadcast device 502 or relative to the protected area 504. In a particular embodiment, the UHF LAN controller 514 may grant permission for the HBS 520 to operate based on measurements of the signal strengths of licensed operations at a given locale. For example, the measured signal strengths may be stored in an HBS record database accessible by the UHF LAN controller 514. Permission for the MWLAN client 518 to operate may be based on the distance of the HBS 520 from the protected area 504 or the TV broadcast device 502, or the distance of the MWLAN client 518 from the HBS 520. In a particular embodiment, the system 500 may include outdoor "monitor points" or sensors, such as the sensor 530, that may monitor the strength of licensed signals, the signal strength of the HBS 520, the signal strength of the MWLAN 518, or any combination thereof. If each HBS 520 and client 518 transmits a signature as part of its regular activities, then the sensor 530 (or a collection of sensors) can predict whether or not a particular MWLAN client 518 or HBS 520 is likely to cause interference, and the UHF LAN controller 514 may grant permission accordingly. In a particular embodiment, existing infrastructure may be used to implement the sensor 530. For example, existing cellular telephone towers may be used for such measurements.

Based on the three-tier control structure described, a significant amount of whitespace within exclusion zone 506 may be made available for unlicensed users without interference to UHF television broadcast signals. For example, as depicted, only a small HBS disabled area 508 around the protected area 504 may be unavailable for use. The HBS disabled area 508 may be about 3-4 km based on how far MWLAN devices and HBSs may cause interference with licensed television transmissions.

Figure 6:
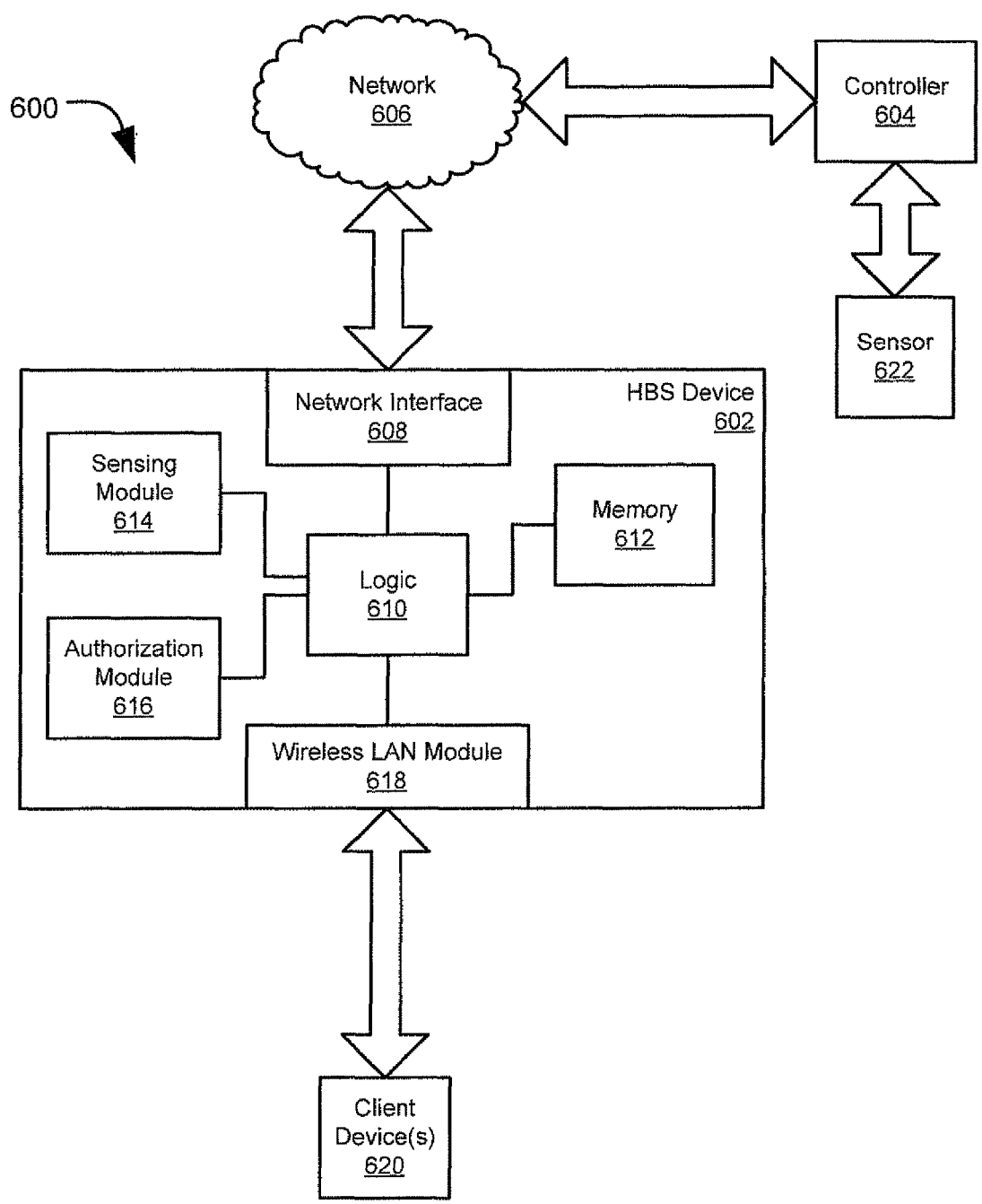
FIG. 6 is block diagram of a sixth particular illustrative embodiment of a system to communicate wirelessly.

FIG. 6 is a block diagram of a sixth embodiment of a system for wireless communication, generally designated 600. The system 600 includes an HBS device 602 adapted to communicate with one or more client devices 620, for example to provide multimedia or broadband data services. The HBS device 602 may also be adapted to communicate with a controller 604 via a network 606 to receive authorization signals. The controller 604 may be a server, such as the server system 102 illustrated in FIG. 1.

In a particular embodiment, HBS device 602 includes a network interface 608 to communicate via a network 606 to the controller 604. The HBS device 602 may also include a memory 612, a sensing module 614, an authentication module 616, a wireless local area network (LAN) module 618, and logic 610.

In a particular embodiment, the sensing module 614 may be adapted to determine whether the client device 620 is within an authorized service area and to authorize a first mobile device to communicate when the first mobile device is within the authorized service area. For example, the sensing device may receive a location signal from the client device 620. The location signal may include information that allows the sensing module 614 to determine the location of the client device 620 or to determine whether the client device 620 is within the authorized service area. In an illustrative embodiment, the location signal may include actual or relative location information for the client device 620, such as global positioning location information. In another illustrative embodiment, the sensing module 614 may utilize power-level sensing and/or radio ranging to estimate the location of the client device 620.

In a particular embodiment, the authorization module 616 may communicate with the controller 604 to receive authorization from the controller 604 for the IBS device 602 to operate using UHF signals. The HBS device 602 may not operate when the authorization from the controller 604 is not received. In a particular embodiment, the FIBS device 602 may not operate in an unlicensed UHF spectrum if authorization is not received from the controller 604, but may operate at other allowed frequencies, such as 900 MHz.

In a particular embodiment, the wireless LAN module 618 includes a wireless transceiver adapted to communicate wirelessly with one or more mobile devices of a local area network. For example, the wireless LAN module 618 communicates with the one or more client devices 620 via UHF transmissions. In another example, the LAN module 618 communicates with one or more client devices 620 using one or more frequencies that correspond to television channels. In another example, the wireless LAN module 618 may communicate with the one or more client devices 620 via UHF transmissions in a first mode and via other wireless frequencies in a second mode. In a particular embodiment, the LAN module 618 can include a first transceiver adapted to communicate wirelessly using UHF signals and a second transceiver adapted to communicate wirelessly using signals having a different frequency, such as 802.11-type signals, other frequency signals, or any combination thereof. In a particular example, the LAN module 618 can receive an authorization to communicate using UHF signals and can communicate with one or more devices using UHF signals and with other devices using the different frequency signals, concurrently. In another particular example, the LAN module 618 does not receive the authorization and can communicate with one or more devices using unlicensed frequency signals (such as WiFi), but not using licensed UHF signals.

In a particular embodiment, the system 600 may include a sensor 622. The sensor 622 may monitor transmissions within a frequency band associated with a communication channel. If the sensor detects a transmission from the BBS device 602 or from the client device 620 in an unauthorized area, the sensor 622 may send a signal to the controller 604 indicating that the transmission was detected. The signal from the sensor 622 may also indicate which device, such as the HBS device 602 or the client device 620, was responsible for the transmission. Based on the signal from the sensor 622, the controller 604 may deactivate or withdraw authorization for the identified device.

Figure 7:
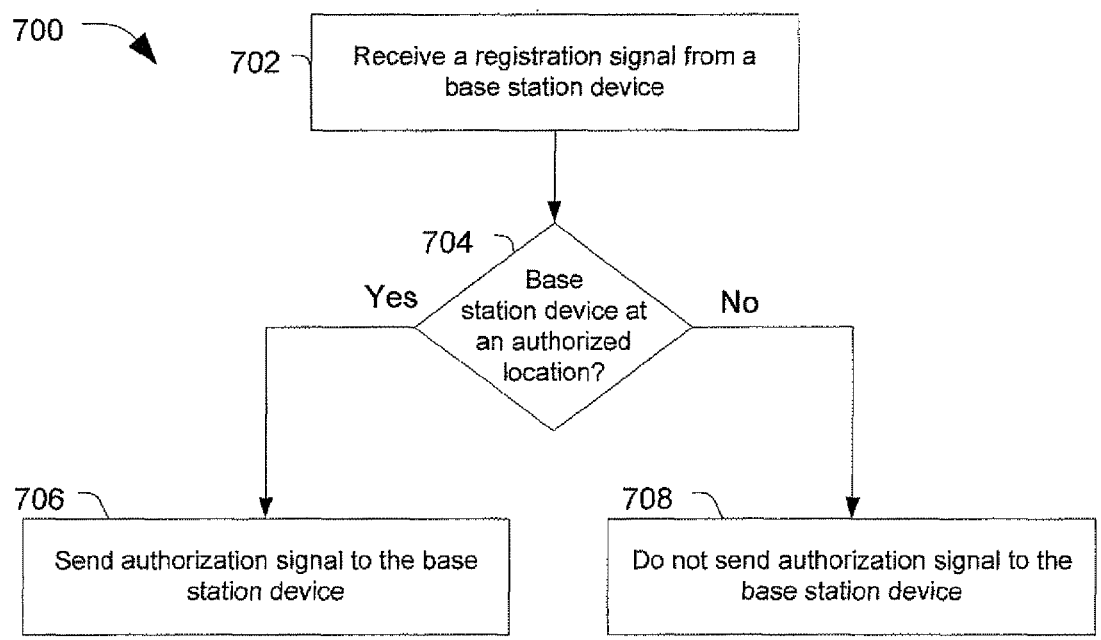
FIG. 7 is a flow diagram of a particular illustrative embodiment of a method of communicating wirelessly.

FIG. 7 is a flow diagram of an embodiment of a method of wireless communication, generally designated 700. The method 700 includes, at 702, receiving a registration signal from a base station device, such as an Ultra-High Frequency (UHF) local area network base station. The registration signal may be a request for authorization to communicate with one or more mobile devices using UHF signals. The method also includes, at 704, determining whether the base station device is at an authorized location. If the base station device is at an authorized location, the method 700 includes, at 706, sending an authorization signal to the base station device. If the base station device is not at an authorized location, the method 700 includes, at 708, not sending the authorization signal to the base station. In a particular embodiment when the base station device is not at an authorized location, the method may include sending a shutdown signal to the base station device to control the base station device to turn off UHF transmission functionality.

In a particular example, the authorized location may be determined by comparing a current location of the base station to a base station device record stored in a database file. In a particular embodiment, the authorized location may be determined by comparing global positioning system (GPS) location data to location data associated with a protected area of a television broadcast device, such as a broadcast television tower. In another example, a location of a base station device may be determined from logical network address information, other location information, or any combination thereof. Additionally, the location of portable devices, such as wireless Personal Computer Memory/Card International Association (PCM/CIA) card for a portable computing devices, that communicate with the base station device may be determined from GPS location data, signal attenuation measurements, other location information, or any combination thereof.

Figure 8:
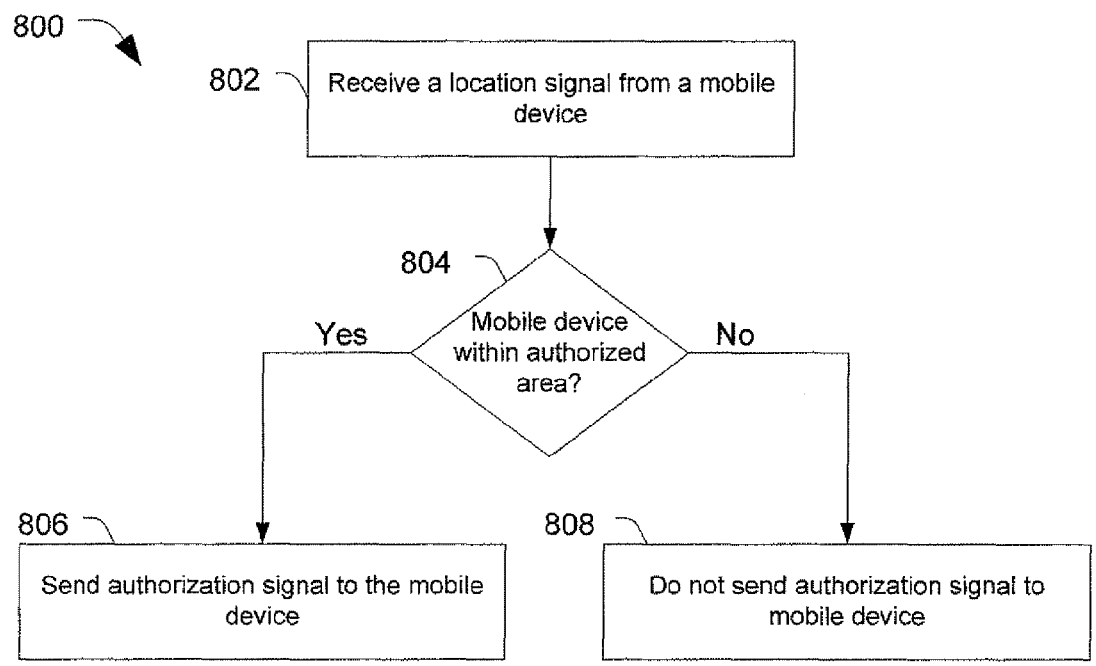
FIG. 8 is a flow diagram of a second particular illustrative embodiment of a method of communicating wirelessly.

FIG. 8 is a flow diagram of a second embodiment of a method of wireless communication, generally designated 800. In a particular embodiment, the method 800 includes, at 802, receiving a location signal from a portable device, such as a wireless Personal Computer Memory/Card International Association (PCM/CIA) card for a portable computing device. The method 800 may also include, at 804, determining, based on the location signal, whether the mobile device is within an authorized area. For example, determining whether the mobile device is within the authorized area may include analyzing a signal strength of the location signal, comparing GPS location data to known UHF whitespace areas, other information, or any combination thereof. In a particular embodiment, the authorized area may be associated with a subscriber residence. If the mobile device is within the authorized area, the method 800 may include sending an authorization signal to the mobile device, at 806. If the mobile device is not within the authorized area, the method 800 advances to 808 and the system does not send an authorization signal to the mobile device. In a particular embodiment, the mobile device may include a home base station device, a UHF LAN device, a television device, a set-top box device, a telephone, a computing device, a personal digital assistant (PDA) device, or any combination thereof.

Figure 9:
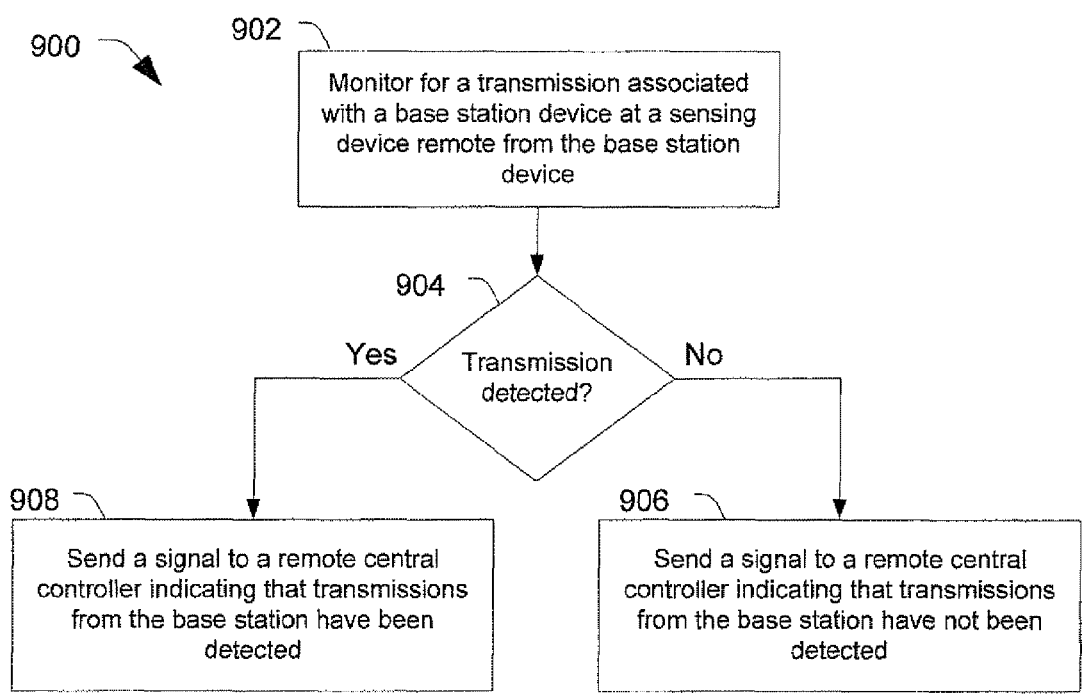
FIG. 9 is a flow diagram of a third particular illustrative embodiment of a method of communicating wirelessly.

FIG. 9 is a flow diagram of a third embodiment of a method of wireless communication, generally designated 900. In a particular embodiment, the method 900 includes, at 902, monitoring for a transmission associated with a base station device at a sensing device that is remote from the base station device. Advancing to 904, the method includes determining whether a transmission is detected. If no transmission associated with the base station device is detected, the method 900 continues to 906 and a signal is sent to a remote central controller indicating that transmissions from the base station have not been detected. If a transmission associated with the base station device is detected at 904, the method 900 may include, at 908, sending a deactivation signal to the controller indicating that transmissions from the base station have been detected. In response to the deactivation signal, the controller may revoke or withdraw an authorization of the base station to transmit. In a particular illustrative embodiment, the controller may send a shut down signal to the base station to turn off a UHF transceiver.

Figure 10:
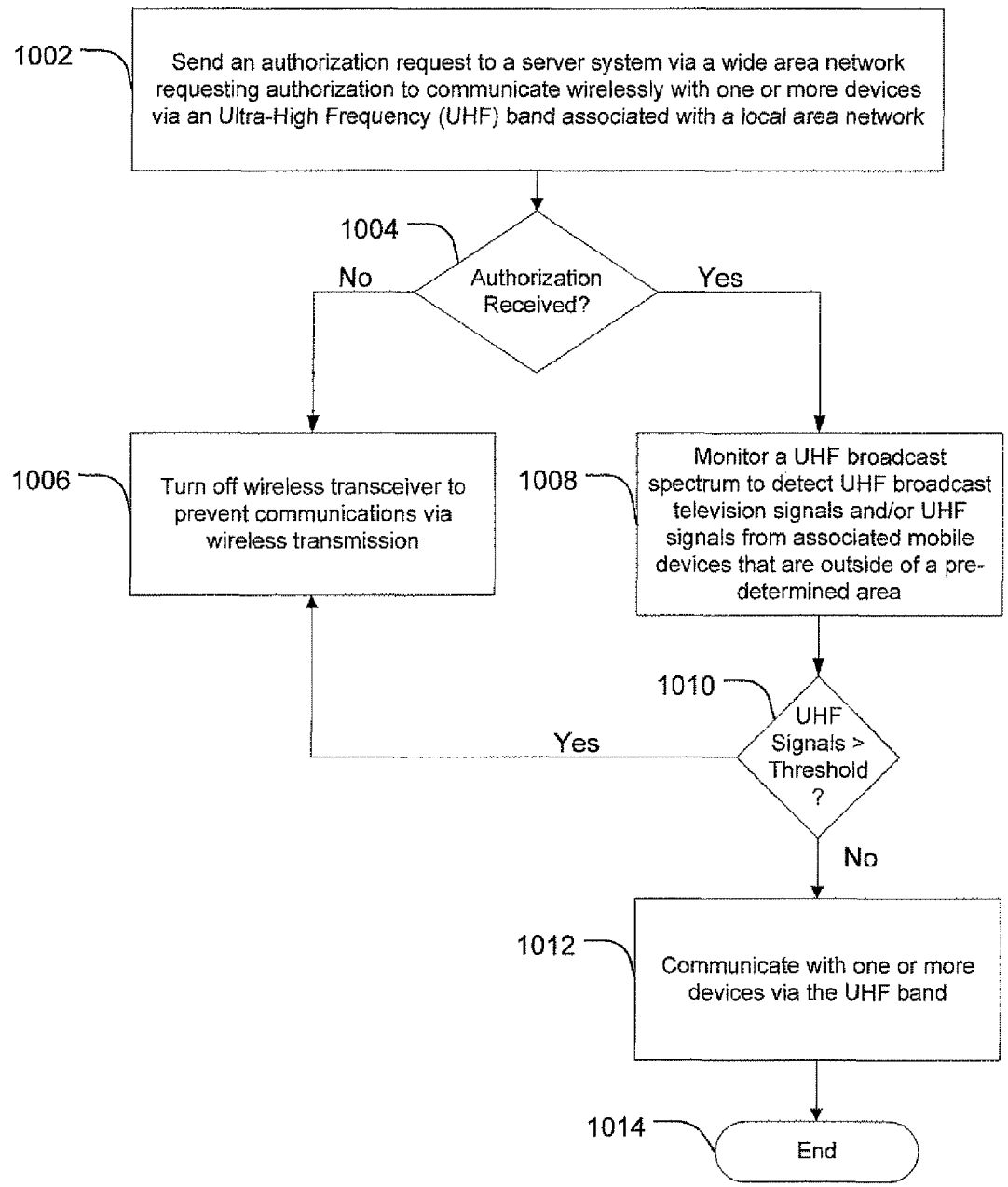
FIG. 10 is a flow diagram of a fourth particular illustrative embodiment of a method of communicating wirelessly.

FIG. 10 is a flow diagram of a particular illustrative embodiment of a method of communicating wirelessly. At 1002, the method includes sending an authorization request to a server system via a wide area network requesting authorization to communicate wirelessly with one or more devices via an Ultra-High Frequency (UHF) band associated with a local area network. In a particular embodiment, the authorization request may be a registration signal. Advancing to 1004, the method includes determining whether an authorization is received. If no authorization is received or if the authorization request is denied, the method advances to 1006 and the method includes turning off the wireless transceiver to prevent communications via wireless transmission. If an authorization is received, the method advances to 1008 and a AF broadcast spectrum is monitored to detect UHF broadcast television signals and/or UHF signals from associated mobile devices that are outside of a predetermined area. At 1010, if detected UHF signals exceed a threshold value, the method advances to 1006 and a wireless transceiver is turned off (deactivated) to prevent communications via wireless transmission. If the detected UHF signals do not exceed a threshold value, the method includes, at 1012, communicating with the one or more devices via frequencies in the UHF band. In a particular embodiment, the UHF band can include an unused television channel within a UHF broadcast spectrum.

In a particular example, the method may include comparing a signal strength of detected broadcast television signals to a threshold value and, when the signal strength of the detected broadcast television signals fall below the threshold value, generating the authorization request. In another particular example, the blocks or method steps illustrated in FIG. 10 may be rearranged. For example, if an authorization is received at 1004, the method may advance to 1012 and communication with the one or more devices via the UHF band may begin. Subsequently, the method may include monitoring a UHF broadcast spectrum 1008 or monitoring for the particular band at which the communication is occurring to prevent UHF transmission in protected UHF broadcast regions. Additionally, the comparison of detected UHF signals (indicated at 1010) may also occur after the UHF communications have begun. In a particular embodiment, the monitor 1008 might not used at all. In this example, if an authorization is received at 1004, the method proceeds directly to 1012 and communication with the one or more devices via the UHF band may begin.

In a particular embodiment, unlike Wireless Regional Area Networks, where the base station is a fixed part of a wide area system infrastructure, the HBS may be a consumer product.

Although the HBS may be portable, a control technique and a control system may be used to provide that the HBS operates only from a known authorized location. The disclosed systems and methods may offer a powerful solution to the problem of ensuring that portable whitespace devices remain within an authorized area of operation (e.g., within a home). This solution may reduce concerns that interference from portable devices may be unmanageable. Additionally, residential MWLAN operation may be of great benefit to reducing the cost of setting up and maintaining services to broadband customers. Further, the systems and methods disclosed allow more whitespace to be available for MWLAN operation. This is in contrast to spectrum-sensing approaches, which, in some cases, may needlessly put virtually all the whitespace into an exclusion zone.

Figure 11:
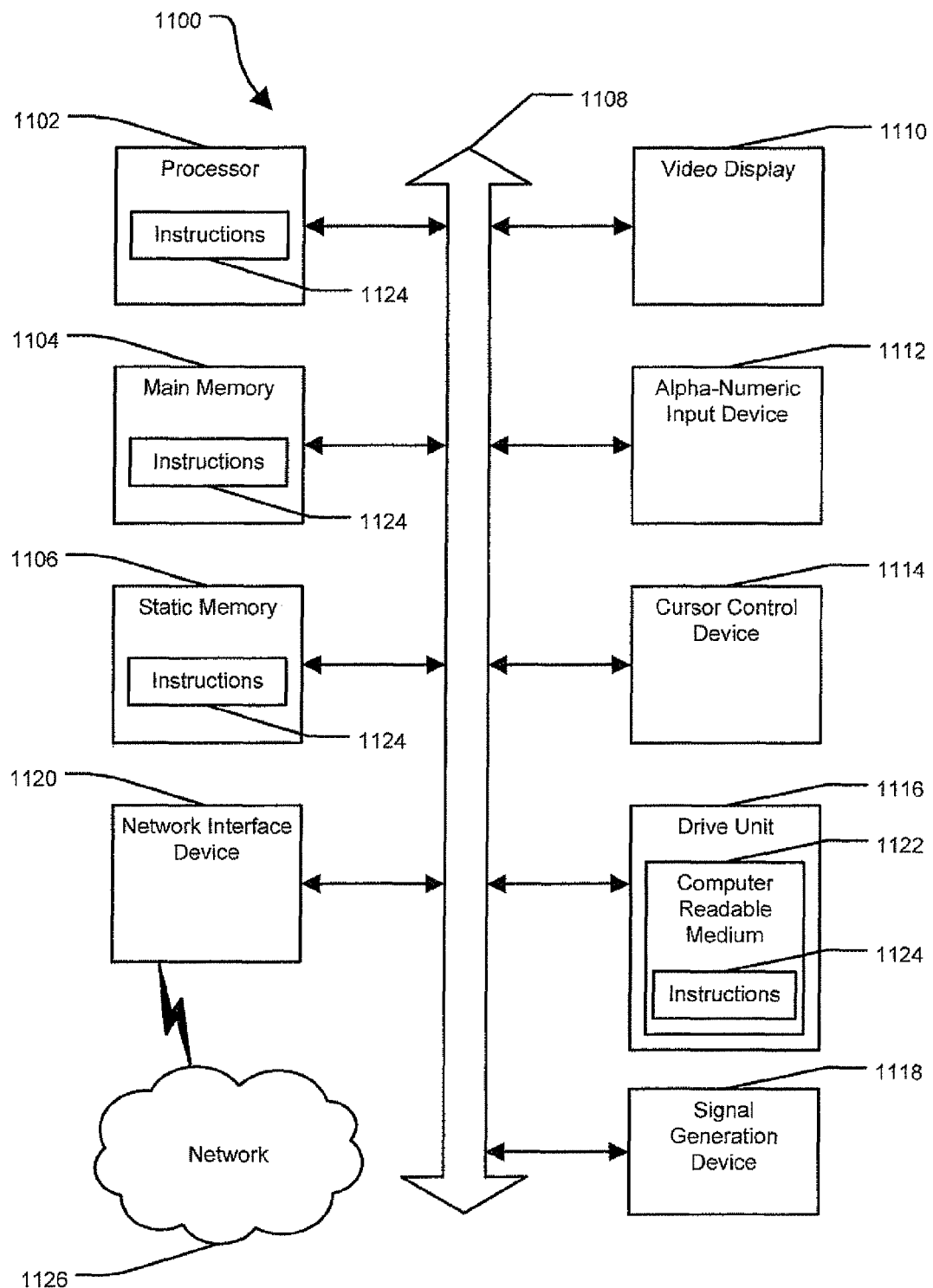
FIG. 11 is a block diagram of an illustrative embodiment of a general computer system.

Referring to FIG. 11, an illustrative embodiment of a general computer system is shown and is designated 1100. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices. In a particular illustrative embodiment, the system 1100 may be used to implement the server system the UHF LAN access point, the user devices, the UHF access point controller, the remotely located central controllers, the home base station device, and other devices illustrated and/or described with respect to FIGS. 1-10.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics processing unit (GPU), or both. Moreover, the computer system 1100 can include a main memory 1104 and a static memory 1106, that can communicate with each other via a bus 1108. As shown, the computer system 1100 may further include a video display unit 1110, such as a liquid crystal display (LOT), an organic light emitting diode (OLED), a flat panel display, a solid state display, or a cathode ray tube (CRT). Additionally, the computer system 1100 may include an input device 1112, such as a keyboard, and a cursor control device 1114, such as a mouse or a remote control. The computer system 1100 can also include a disk drive unit 1116, a signal generation device 1118, such as a speaker, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/TP, HTML, HTTP) and standards for wireless transmission (e.g., 802.11-type signals, 900 MHz signals, UHF signals) represent examples of the state of the art. Such standards are periodically superseded by faster or more efficient equivalents having essentially the same functions. Further, wireless transmission standards may be changed by governmental agencies, such as the FCC. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A base station device comprising:
   an interface coupled to a network to communicate with a remote central controller device;
   a wireless transceiver adapted to communicate wirelessly with one or more portable devices via a local area network;
   a processor coupled to the interface and to the wireless transceiver, the processor configured to execute instructions to:
      send an authorization request to the remote central controller device requesting to communicate wirelessly with the one or more portable devices via the local area network;
      receive from the remote central controller device an authorization to communicate wirelessly with the one or more portable devices via the local area network;
      selectively activate the wireless transceiver after receiving the authorization; and
      turn off the wireless transceiver in response to receiving a shut down signal from the remote central controller device; and
   a sensing module to determine a location of the base station device relative to an ultra-high frequency whitespace, wherein the processor communicates data related to the location to the remote central controller device to request the authorization.

2. The base station device of claim 1, wherein the wireless transceiver communicates with the one or more portable devices via an ultra-high frequency transmission.

3. The base station device of claim 1, further comprising an ultra-high frequency sensing module to detect an ultra-high frequency television signal, wherein the processor communicates data related to detection of the ultra-high frequency television signal to the remote central controller device.

4. The base station device of claim 3, wherein the processor prohibits the wireless transceiver from transmitting ultra-high frequency signals until the authorization is received.

5. The base station device of claim 1, wherein the network comprises an Internet Protocol network.

6. The base station device of claim 1, further comprising a sensing module to scan a plurality of channels within an ultra-high frequency television band for unused channels, the sensing module to communicate data related to the unused channels to the remote central controller device to seek authorization to communicate wirelessly with the one or more portable devices using at least one of the unused channels.

7. A controller system comprising:
   an interface to receive an authorization request from a base station device via a network, the authorization request including data related to a first location of the base station device; and
   processing logic coupled to the interface, the processing logic configured to execute instructions to:
      selectively authorize, based on the data related to the first location, wireless ultra-high frequency communications by the base station device with one or more devices;
      communicate an authorization to the base station device via the network; and
      revoke the authorization in response to determining that the base station device is located at a second location that is different from the first location, wherein the data related to the first location comprises data related to ultra-high frequency signals detected by the base station device, wherein the processing logic authorizes the wireless ultra-high frequency communications when the ultra-high frequency signals have an associated signal strength that is below a threshold.

8. The controller system of claim 7, wherein the processing logic authorizes the wireless ultra-high frequency communications by the base station device when the base station device is located in an ultra-high frequency whitespace area.

9. The controller system of claim 7, wherein the data related to the first location comprises data identifying one or more unused ultra-high frequency channels detected by the base station device, and wherein the processing logic authorizes the wireless ultra-high frequency communications by the base station device via the one or more unused ultra-high frequency channels.

10. The controller system of claim 7, wherein the network comprises at least one of a public switched telephone network, a cable network, an Internet Protocol network, and a wireless network.

11. The controller system of claim 7, wherein the data related to the first location comprises a logical address of the base station device and comprises data related to one or more network devices associated with the base station device.

12. The controller system of claim 11, wherein the processing logic determines whether the first location is an authorized location and wherein the processing logic sends the authorization to the base station device when the logical address and the data related to the one or more network devices indicate that the base station device is located at the authorized location.

13. The controller system of claim 12, wherein the processing logic does not send the authorization when the logical address and the data related to the one or more network devices indicate that the base station device is located at an unauthorized location.

14. The controller system of claim 13, wherein the unauthorized location is a protected area that is associated with one or more television broadcast devices.

15. A method comprising:
monitoring an ultra-high frequency broadcast spectrum to detect a broadcast television signal;
comparing a signal strength of the broadcast television signal to a threshold value;
when the signal strength of the broadcast television signal falls below the threshold value, generating an authorization request, wherein the authorization request includes data related to the broadcast television signal;
sending the authorization request from a base station device to a server system via a wide area network to request authorization to communicate wirelessly with one or more devices via an ultra-high frequency band associated with a local area network;
in response to receiving an authorization from the server system, communicating with the one or more devices via the ultra-high frequency band; and
in response to receiving a shut down signal from the server system, turning off a wireless transceiver that is used to communicate with the one or more devices.

16. The method of claim 15, wherein the ultra-high frequency band comprises one or more unused television channels within an ultra-high frequency broadcast spectrum.

17. The method of claim 15, further comprising preventing communications via wireless transmission in the ultra-high frequency band until the authorization is received.

18. A system comprising:
processing logic and memory accessible to the processing logic, the memory comprising instructions executable by the processing logic to:
receive a registration signal from a base station device;
determine whether the base station device is located at an authorized location;
send an authorization signal to the base station device in response to determining that the base station device is located at the authorized location, the authorization signal indicating an authorization for the base station device to communicate wirelessly with one or more devices using a frequency in an ultra-high frequency band; and
send a revocation signal revoking the authorization in response to detecting that the base station device is located at a second location that is different from the authorized location, wherein the registration signal comprises information related to ultra-high frequency signals detected by the base station device and wherein the processing logic authorizes ultra-high frequency communications when the ultra-high frequency signals have an associated signal strength that is below a threshold.

19. The system of claim 18, further comprising the base station device.

20. The system of claim 18, wherein the authorized location comprises an ultra-high frequency whitespace area.

21. The system of claim 18, wherein the memory further comprises instructions executable by the processing logic to communicate with a sensor to receive data indicating reception of an ultra-high frequency signal at the sensor, the processing logic to determine a location of the base station device or a location of one or more mobile devices associated with the base station device based on the received data.

* * * * *